(12) United States Patent
Behera et al.

(10) Patent No.: US 12,333,400 B2
(45) Date of Patent: Jun. 17, 2025

(54) SYSTEMS AND METHODS FOR FEDERATED LEARNING USING DISTRIBUTED MESSAGING WITH ENTITLEMENTS FOR ANONYMOUS COMPUTATION AND SECURE DELIVERY OF MODEL

(71) Applicant: JPMORGAN CHASE BANK, N.A., New York, NY (US)

(72) Inventors: Monik Raj Behera, Odisha (IN); Sudhir Upadhyay, Edison, NJ (US); Rob Otter, Witham (GB); Suresh Shetty, Mangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 878 days.

(21) Appl. No.: 17/456,113

(22) Filed: Nov. 22, 2021

(65) Prior Publication Data

US 2022/0164712 A1 May 26, 2022

(30) Foreign Application Priority Data

Nov. 20, 2020 (IN) .............................. 202011050561

(51) Int. Cl.
*G06N 20/20* (2019.01)
*G06F 21/60* (2013.01)
(Continued)

(52) U.S. Cl.
CPC ........... *G06N 20/20* (2019.01); *G06F 21/602* (2013.01); *H04L 9/0825* (2013.01); *H04L 63/04* (2013.01)

(58) Field of Classification Search
CPC .......... G06N 20/00; G06N 3/09; G06N 3/094; G06N 3/098; G06N 3/08; G06N 5/022;
(Continued)

(56) References Cited

U.S. PATENT DOCUMENTS

2002/0087884 A1* 7/2002 Shacham ................ H04L 9/302
726/8

FOREIGN PATENT DOCUMENTS

CN 111666987 9/2020

OTHER PUBLICATIONS

International Search Report, dated Mar. 2, 2022, from corresponding International Application No. PCT/US2021/072556.
(Continued)

*Primary Examiner* — Mohammed Waliullah
(74) *Attorney, Agent, or Firm* — GREENBERG TRAURIG LLP

(57) ABSTRACT

A method may include an aggregator node in a distributed computer network: generating an aggregator node public/private key pair; communicating the aggregator node public key to participant nodes; receiving, from each participant node, a message comprising a local machine learning (ML) model encrypted with a participant node private key and the aggregator node public key, and a participant node public key encrypted with the aggregator node public key; decrypting the local ML models and the participant node public keys using the aggregator node public key; decrypting the local ML models using the participant node public keys; generating an aggregated ML model based on the local ML models; encrypting, with each participant node public key, the aggregated ML model; and communicating the encrypted ML models to all participant nodes. Each participant node decrypts one of the encrypted ML models and modifies its local ML model with the aggregated ML model.

15 Claims, 3 Drawing Sheets

(51) Int. Cl.
*H04L 9/08* (2006.01)
*H04L 9/40* (2022.01)

(58) Field of Classification Search
CPC ......... H04L 9/50; H04L 63/061; H04L 41/16; H04L 2209/60; G06F 16/24556; G06F 21/6245; G06F 2207/4824
See application file for complete search history.

(56) References Cited

OTHER PUBLICATIONS

Written Opinion of the International Searching Authority, dated Mar. 2, 2022, from corresponding International Application No. PCT/US2021/072556.

Zhang Jiale; et al. "PEFL: A Privacy-Enhanced Federated Learning Scheme for Big Data Analytics", 2019 IEEE Global Communications Conference (GLOBECOM), IEEE, Dec. 9, 2019, pp. 1-6, XP033722969.

\* cited by examiner

SYSTEMS AND METHODS FOR FEDERATED LEARNING USING DISTRIBUTED MESSAGING WITH ENTITLEMENTS FOR ANONYMOUS COMPUTATION AND SECURE DELIVERY OF MODEL

RELATED APPLICATIONS

This application claims the benefit of, and priority to, Indian Patent Application No. 202011050561, filed Nov. 20, 2020, the disclosure of which is hereby incorporated, by reference, in its entirety.

BACKGROUND OF THE INVENTION

1. Field of the Invention

Embodiments generally relate to systems and methods for federated learning using distributed messaging with entitlements for anonymous computation and secure delivery of model.

2. Description of the Related Art

In an operator managed, decentralized, peer-to-peer network, various regulations and compliance mandate participants data privacy from both other participants and the network. However, by the same regulations and compliance, the network operator still is required to ensure the normal operation of the network by identifying any malicious activity and actors on the network. Further, the network participants want to learn and benefit from other participants' data without exposing their data. This poses a challenge to the network operator and diminishes the value for a participant to be part of such a network.

Federated machine learning allows for user data to be private and localized while still allowing the analytics to be done on the individual data, without exposure of the underlying data. There are multiple federated learning frameworks, and most are still evolving.

SUMMARY OF THE INVENTION

Systems and methods for federated learning using distributed messaging with entitlements for anonymous computation and secure delivery of model are disclosed. In one embodiment, a method for federated learning using distributed messaging may include: (1) generating, by an aggregator node in a distributed computer network, an aggregator node public/private key pair; (2) communicating, by the aggregator node, the aggregator node public key to a plurality of participant nodes in the distributed computer network; (3) receiving, by the aggregator node and from each of the participant nodes, a message comprising a local machine learning (ML) model encrypted with a participant node private key and with the aggregator node public key, and a participant node public key corresponding to the participant node private key, the participant node public key encrypted with the aggregator node public key; (4) decrypting, by the aggregator node, the local ML models and the participant node public keys using the aggregator node public key; (5) decrypting, by the aggregator node, the local ML models using the participant node public keys; (6) generating, by the aggregator node, an aggregated ML model based on the local ML models; (7) encrypting, by the aggregator node and with each participant node public key, the aggregated ML model; and (8) communicating, by the aggregator node, the encrypted ML models to all participant nodes. Each participant node decrypts one of the encrypted ML models using its participant node private key, and modifies its local ML model with the aggregated ML model.

In one embodiment, the aggregator node may communicate the aggregator node public key to the plurality of participant nodes in the distributed computer network using a first plain communication channel, wherein the first plain communication channel is configured to allow the aggregator node to write and to allow the participant nodes to read.

In one embodiment, the aggregator node may also communicate a request for the local ML models to the participant nodes.

In one embodiment, the participant nodes may remove their respective participant node public and private keys after decrypting the aggregated ML model.

In one embodiment, the encrypted local ML models may be received over a first encrypted communication channel, wherein the first encrypted communication channel is configured to allow the participant nodes to write and to allow the aggregator node to read.

In one embodiment, the aggregator node may communicate the encrypted ML models to all participant nodes over a second encrypted communication channel, wherein the second encrypted communication channel is configured to allow the aggregator node to write and to allow the participant nodes to read.

According to another embodiment, a method for federated learning using distributed messaging may include: (1) receiving, by a participant node in a distributed computer network comprising a plurality of participant nodes and from an aggregator node in the distributed computer network, an aggregator node public key; (2) generating, by the participant node, a participant node public/private key pair; (3) encrypting, by the participant node, a local machine learning (ML) model encrypted with the participant node private key; (4) encrypting, by the participant node, the encrypted local ML model and the participant node public key with the aggregator node public key; (5) communicating, by the participant node, the encrypted ML model and the encrypted participant node public key to the aggregator node; (6) receiving, from the aggregator node, a plurality of encrypted aggregated ML models, each aggregated ML models encrypted with a private key for one of the plurality of participant nodes; (7) decrypting, by the participant node, one of the encrypted aggregated ML model using the participant node private key; and (8) updating, by the participant nodes, the local ML model based on the aggregated ML model.

In one embodiment, the aggregator node public key may be received using a first plain communication channel, wherein the first plain communication channel is configured to allow the aggregator node to write and to allow the participant nodes to read.

In one embodiment, the method may further include receiving, by the participant node, a request for the local ML models from the aggregator node.

In one embodiment, the method may further include removing, by the participant node, the participant node public and private keys after decrypting the aggregated ML model.

In one embodiment, the encrypted local ML model may be communicated over a first encrypted communication channel, wherein the first encrypted communication channel is configured to allow the participant nodes to write and to allow the aggregator node to read.

In one embodiment, the encrypted ML model may be received over a second encrypted communication channel, wherein the second encrypted communication channel is configured to allow the aggregator node to write and to allow the participant nodes to read.

According to another embodiment, a distributed computing system may include an aggregator node, a plurality of participant nodes, a first plain communication channel that is configured to allow the aggregator node to write and to allow the participant nodes to read, a first encrypted communication channel that is configured to allow the participant nodes to write and to allow the aggregator node to read, and a second encrypted communication channel that is configured to allow the aggregator node to write and to allow the participant nodes to read. The aggregator node may generate an aggregator node public/private key pair and communicate the aggregator node public key to the plurality of participant nodes over a first plain communication channel. Each of the participant nodes may generate a participant node public/private key pair, encrypt a local machine learning (ML) model encrypted with the participant node private key, encrypt the encrypted local ML model and the participant node public key with the aggregator node public key, and communicate the encrypted ML model and the encrypted participant node public key to the aggregator node over the first encrypted communication channel. The aggregator node may decrypt the encrypted local ML models and the participant node public keys using the aggregator node public key, decrypt the local ML models using the participant node public keys, generate an aggregated ML model based on the local ML models, encrypt the aggregated ML model with each participant node public key, and communicate the encrypted ML models to all participant nodes over the second encrypted communication channel. Each of the participant nodes may receive the plurality of encrypted aggregated ML models from the aggregator node, decrypt one of the encrypted aggregated ML model using the participant node private key, and its local ML model based on the aggregated ML model.

In one embodiment, each of the participant nodes may remove its participant node public and private keys after decrypting the aggregated ML model.

In one embodiment, the aggregator node may also communicate a request for the local ML models to the participant nodes.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for federated learning using distributed messaging with entitlements for anonymous computation and secure delivery of model.

Embodiments may be used in an operator-managed private, permissioned, consortium blockchain-based network. On a permissioned blockchain network, most of the activities may be categorized into two broad categories: transactional data between participants and network related metadata.

Examples of transactional data between participants may include data related to trades, personal information, token, money transfer, etc. The data could be classified as highly confidential and sensitive.

Examples of network related metadata may include a count of a specific categories of transactions, a frequency of transactions, throughput and latency of such transactions, etc.

Transactional data between participants may be used to train machine learning models that can learn from such data to identify anomalies or specific patterns in the transactions. Such models, when fully trained, can make predictions for future transactions.

To further illustrate anomalies, two participants have learnt that they have observed a large number of transactions for a specific currency in the last 24 hours that can be attributed to a specific geopolitical event. Interestingly, other pairs of participants have observed a similar behavior/patterns across other events. However, none of the participants can share the underlying data with other participants but still learn from these patterns from others.

Embodiments may provide a framework that allows participants on an enterprise, permissioned peer-to-peer to network to learn from other participants' data without compromising the privacy of their private transactional data.

The disclosure of Behera et al. "Federated Learning using Distributed Messaging with Entitlements for Anonymous Computation and Secure Delivery of Model" (2020) available at dx.doi.org/10.36227/techrxiv.13318163.v1, is hereby incorporated, by reference, in its entirety.

Figure 1:
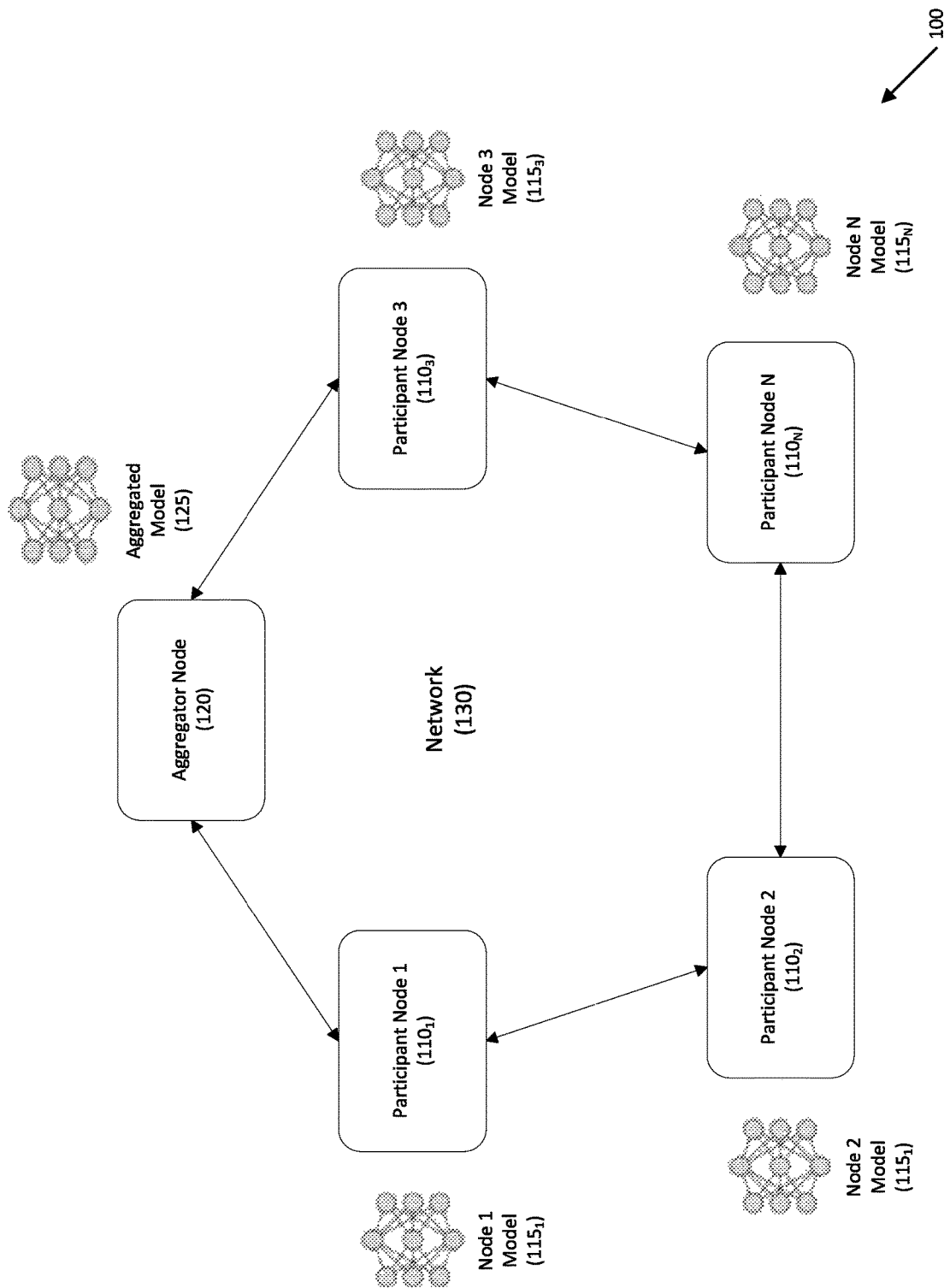
FIG. 1 depicts a system for federated learning using distributed messaging with entitlements for anonymous computation and secure delivery of model according an embodiment.

Referring to FIG. 1, a system for federated learning using distributed messaging with entitlements for anonymous computation and secure delivery of model is disclosed according an embodiment. System 100 may include network 130, which may be any suitable computer network that may connect a plurality of participant nodes 110 (e.g., participant node 1 110$_1$, participant node 2 110$_2$, participant node 3 110$_3$, . . . participant node N 110$_N$) and aggregator node 120. In one embodiment, network 130 may be a permissioned blockchain-based network.

In one embodiment, network 130 may be a permissioned network.

Each participant node 110 may include a local machine learning model 115 (e.g., node 1 model 115$_1$, node 2 model 115$_2$, node 3 model 115$_3$, . . . node N model 115$_N$). Aggregator node 120 may generate aggregated model 125 based on data received from participant nodes 110.

Participant nodes 110 may communicate their respective local machine learning models (e.g., node 1 model 115$_1$, node 2 model 115$_2$, node 3 model 115$_3$, . . . node N model 115$_N$) with aggregator node 120 using a secure messaging protocol, such as message level dynamic cryptography. For example, participant nodes 110 may encrypt their respective local machine learning models 115 and may send the encrypted models to aggregator node 120 in a manner that anonymizes the identity of the sending participant node 110. Aggregator node 120 may decrypt the encrypted data without knowing the identity of the sending participant nodes 110.

Aggregator node 120 may aggregate the received decrypted local machine learning models (e.g., node 1 model $115_1$, node 2 model $115_2$, node 3 model $115_3$, ... node N model $115_N$), and may perform federated learning on the models, and may generate aggregated model 125. It may then send aggregated model 125 to participant nodes 110. Aggregated model 125 may be encrypted, or it may be unencrypted. Participant nodes 110 may update their respective models 115 as is necessary and/or required. The federated learning process may continue until an objective is reached, such as the different local models 115 converge to a desired point.

Figure 2:
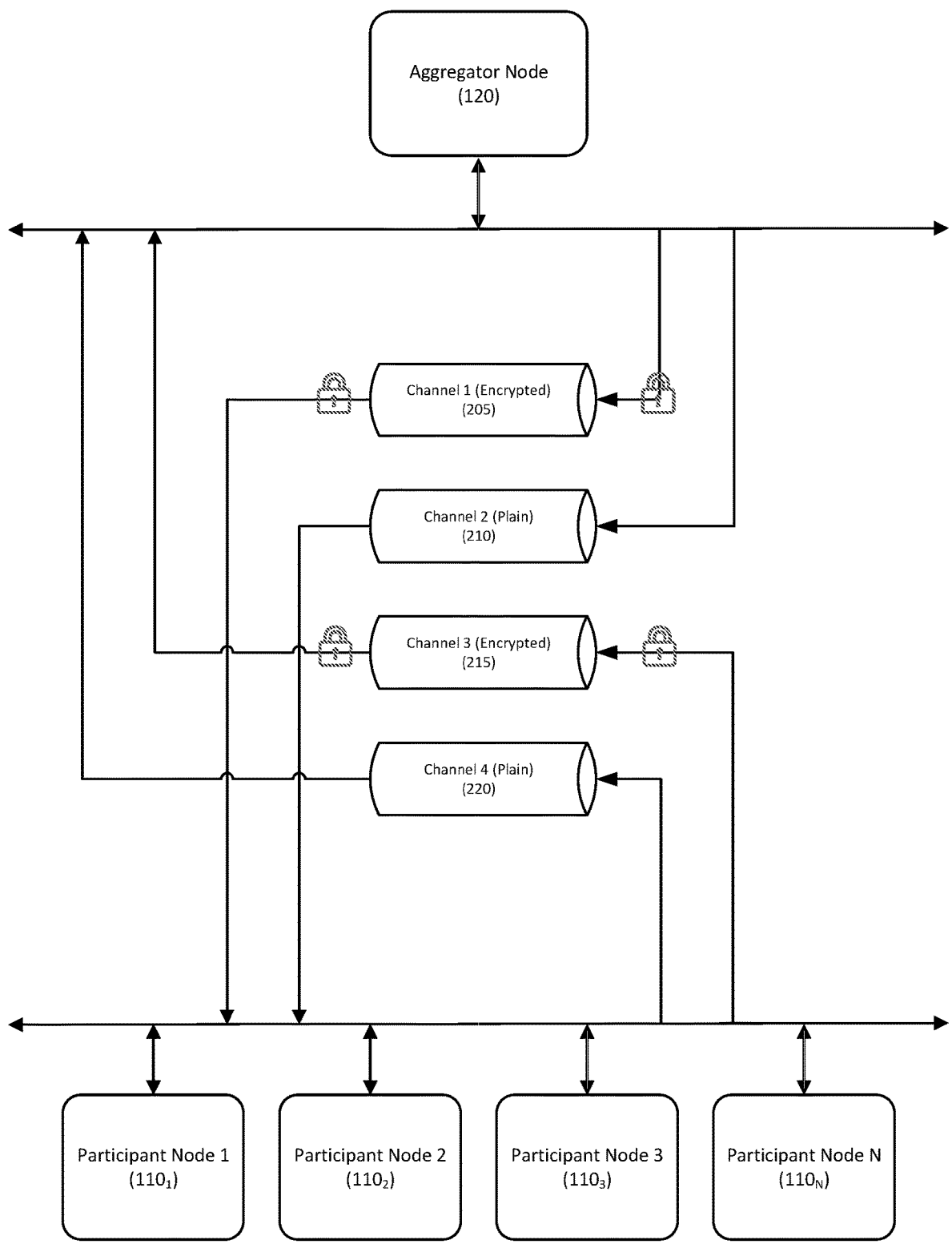
FIG. 2 depicts a communication topology that may be used with the system of FIG. 1 according to an embodiment.

Referring to FIG. 2 a communication topology that may be used with the system of FIG. 1 is provided according to one embodiment. In embodiments, four communication channels, channel 1 (encrypted) 205, channel 2 (plain) 210, channel 3 (encrypted) 215, and channel 4 (plain) 220, may be established between aggregator node 120 and participant nodes 110. In embodiments, each channel may be a topic in an APACHE KAFKA distributed messaging system. Each channel 205, 210, 215, and 220 may be assigned a set of producers and consumers, as illustrated in FIG. 2.

The communication topology of FIG. 2 prevents a participant node from consuming a message from another participant node, or publishing a message that could be consumed by another participant node. Thus, for messages from participant nodes 110 to aggregator node 120, embodiments restrict write access to channel 3 215 for encrypted messages and to channel 4 220 for plain messages to participant nodes 110, and read access to channel 3 215 for encrypted messages and to channel 4 220 for plain messages to aggregator node 120. Similarly, for messages from aggregator node 120 to participant nodes 110, embodiments restrict write access to channel 1 205 for encrypted messages and to channel 2 210 for plain messages to aggregator node 120, read access to channel 1 205 for encrypted messages and to channel 2 210 for plain messages to participant nodes 110.

Thus, for messages from participant nodes 110 to aggregator node 120, embodiments restrict write access to channel 3 215 for encrypted messages and to channel 4 220 for plain messages to participant nodes 110, and read access to channel 3 215 for encrypted messages and to channel 4 220 for plain messages to aggregator node 120. Similarly, for messages from aggregator node 120 to participant nodes 110, embodiments restrict write access to channel 1 205 for encrypted messages and to channel 2 210 for plain messages to aggregator node 120, read access to channel 1 205 for encrypted messages and to channel 2 210 for plain messages to participant nodes 110.

Figure 3:
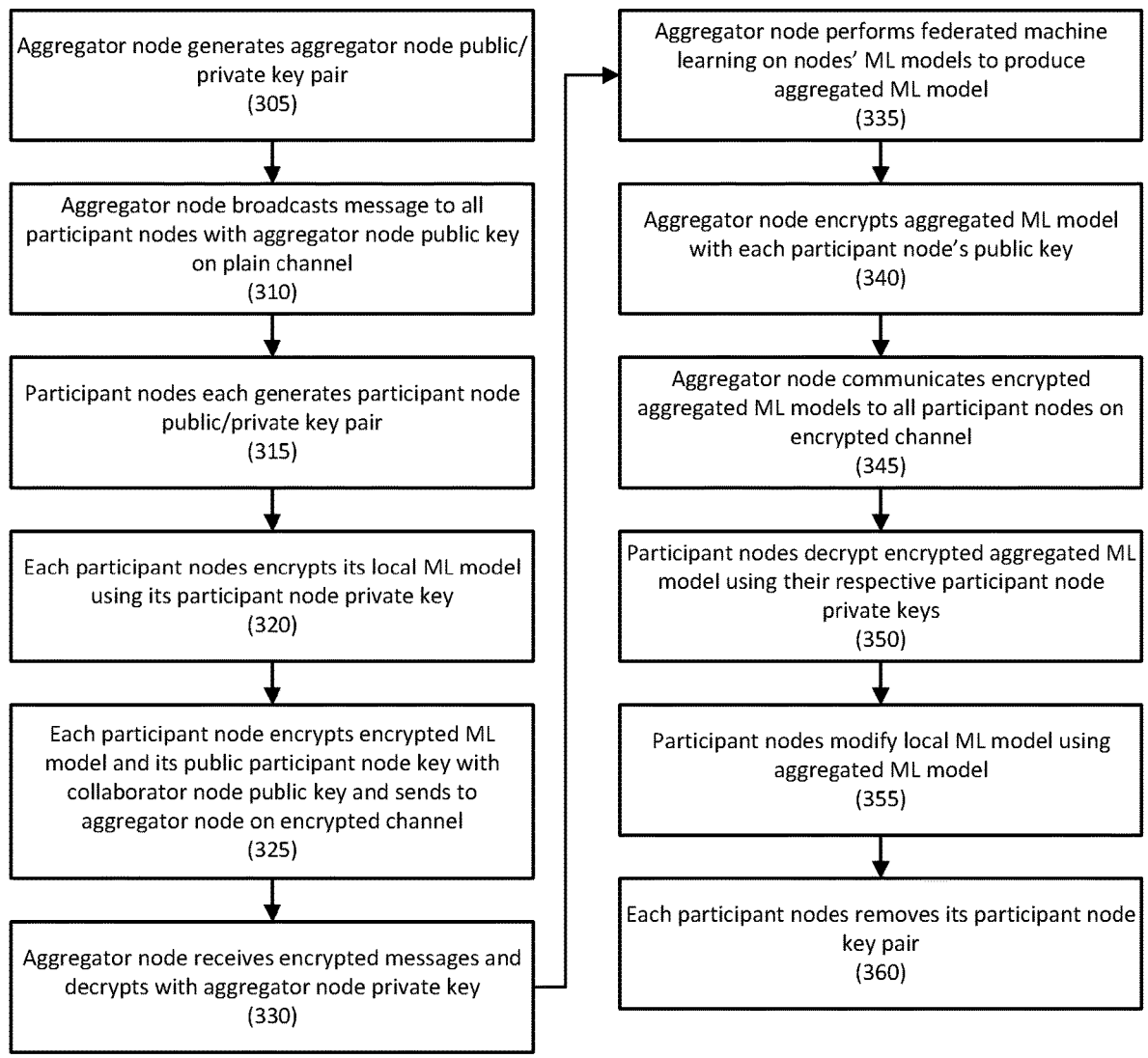
FIG. 3 depicts a method for federated learning using distributed messaging with entitlements for anonymous computation and secure delivery of model according an embodiment.

Referring to FIG. 3, a method for federated learning using distributed messaging with entitlements for anonymous computation and secure delivery of model is disclosed according an embodiment.

In step 305, An aggregator node may generate an aggregator node public/private key pair. The key pair may be a RSA key pair, and the key pair may be persisted.

In step 310, the aggregator node may broadcast a message to all participant nodes with the aggregator node public key on plain channel. In one embodiment, the message may be sent over an unencrypted communication channel.

In one embodiment, the message may include a request for data, such as a request for each participant node's local machine learning model.

In step 315, each participant node may generate a participant node public/private key pair. In one embodiment, the public/private key pair may be a RSA key pair, and it may be used for one roundtrip communication between the participant node and the aggregator node.

In step 320, each participant nodes may retrieve and encrypt its data (e.g., its local ML model) using its private key.

In step 325, each participant node may encrypt the encrypted data and its participant public key with the collaborator node public key, and may send the encrypted data and participant public key to the aggregator node. The participant node may send the encrypted data and participant public key to the aggregator node using an encrypted channel.

In step 330, the aggregator node may receive encrypted messages from the participant nodes and may decrypt each message using the aggregator node private key. This results in a plurality of local ML models and participant node private keys.

In step 335, the aggregator node may perform federated machine learning on the participant nodes' local ML models to produce an aggregated ML model. The aggregator node may perform any suitable process as is necessary and/or desired.

In step 340, the aggregator node may encrypt the aggregated ML model with each participant node's public key, and in step 345, may broadcast the encrypted aggregated models to all participant nodes on an encrypted communication channel.

In step 350, the participant nodes may receive the encrypted aggregated models and may attempt to decrypt each using their respective participant node private key. The participant nodes may retrieve the aggregated ML model from the message that is decrypted with their respective participant node private keys.

In step 355, the participant nodes may modify their local ML models using the aggregated ML model. Any suitable technique may be used as is necessary and/or desired.

In step 360, each participant node may remove its key pairs. For the next communication, each participant node may generate a new key pair. For example, the process may return to step 310 for the next iteration, and the aggregator node may continue to use its aggregator node key pair.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for federated learning using distributed messaging, comprising:
   generating, by an aggregator node in a distributed computer network, an aggregator node public/private key pair;
   communicating, by the aggregator node, the aggregator node public key to a plurality of participant nodes in the distributed computer network;
   receiving, by the aggregator node and from each of the participant nodes, a message comprising a local machine learning (ML) model encrypted with a participant node private key and with the aggregator node public key, and a participant node public key corresponding to the participant node private key, the participant node public key encrypted with the aggregator node public key;
   decrypting, by the aggregator node, the local ML models and the participant node public keys using the aggregator node public key;
   decrypting, by the aggregator node, the local ML models using the participant node public keys;
   generating, by the aggregator node, an aggregated ML model based on the local ML models;
   encrypting, by the aggregator node and with each participant node public key, the aggregated ML model; and
   communicating, by the aggregator node, the encrypted ML models to all participant nodes;
   wherein each participant node decrypts one of the encrypted ML models using its participant node private key, and modifies its local ML model with the aggregated ML model.

2. The method of claim 1, wherein the aggregator node communicates the aggregator node public key to the plurality of participant nodes in the distributed computer network using a first plain communication channel, wherein the first plain communication channel is configured to allow the aggregator node to write and to allow the participant nodes to read.

3. The method of claim 1, wherein the aggregator node further communicates a request for the local ML models to the participant nodes.

4. The method of claim 1, wherein the participant nodes remove their respective participant node public and private keys after decrypting the aggregated ML model.

5. The method of claim 1, wherein the encrypted local ML models are received over a first encrypted communication channel, wherein the first encrypted communication channel is configured to allow the participant nodes to write and to allow the aggregator node to read.

6. The method of claim 1, wherein the aggregator node communicates the encrypted ML models to all participant nodes over a second encrypted communication channel, wherein the second encrypted communication channel is configured to allow the aggregator node to write and to allow the participant nodes to read.

7. A method for federated learning using distributed messaging, comprising:
   receiving, by a participant node in a distributed computer network comprising a plurality of participant nodes and from an aggregator node in the distributed computer network, an aggregator node public key;
   generating, by the participant node, a participant node public/private key pair;
   encrypting, by the participant node, a local machine learning (ML) model encrypted with the participant node private key;
   encrypting, by the participant node, the encrypted local ML model and the participant node public key with the aggregator node public key;
   communicating, by the participant node, the encrypted ML model and the encrypted participant node public key to the aggregator node;
   receiving, from the aggregator node, a plurality of encrypted aggregated ML models, each aggregated ML models encrypted with a private key for one of the plurality of participant nodes;
   decrypting, by the participant node, one of the encrypted aggregated ML model using the participant node private key; and
   updating, by the participant nodes, the local ML model based on the aggregated ML model.

8. The method of claim 7, wherein the aggregator node public key is received using a first plain communication channel, wherein the first plain communication channel is configured to allow the aggregator node to write and to allow the participant nodes to read.

9. The method of claim 7, further comprising:
receiving, by the participant node, a request for the local ML models from the aggregator node.

10. The method of claim 7, further comprising:
removing, by the participant node, the participant node public and private keys after decrypting the aggregated ML model.

11. The method of claim 7, wherein the encrypted local ML model is communicated over a first encrypted communication channel, wherein the first encrypted communication channel is configured to allow the participant nodes to write and to allow the aggregator node to read.

12. The method of claim 7, wherein the encrypted ML model is received over a second encrypted communication channel, wherein the second encrypted communication channel is configured to allow the aggregator node to write and to allow the participant nodes to read.

13. A distributed computing system, comprising:
an aggregator node;
a plurality of participant nodes;
a first plain communication channel that is configured to allow the aggregator node to write and to allow the participant nodes to read;
a first encrypted communication channel that is configured to allow the participant nodes to write and to allow the aggregator node to read; and
a second encrypted communication channel that is configured to allow the aggregator node to write and to allow the participant nodes to read;
wherein:
the aggregator node generates an aggregator node public/private key pair;
the aggregator node communicates the aggregator node public key to the plurality of participant nodes over a first plain communication channel;
each of the participant nodes generates a participant node public/private key pair;
each of the participant nodes encrypts a local machine learning (ML) model encrypted with the participant node private key;
each of the participant nodes encrypts the encrypted local ML model and the participant node public key with the aggregator node public key;
each of the participant nodes communicates the encrypted ML model and the encrypted participant node public key to the aggregator node over the first encrypted communication channel;
the aggregator node decrypts the encrypted local ML models and the participant node public keys using the aggregator node public key;
the aggregator node decrypts the local ML models using the participant node public keys;
the aggregator node generates an aggregated ML model based on the local ML models;
the aggregator node encrypts the aggregated ML model with each participant node public key;
the aggregated ML model communities the encrypted ML models to all participant nodes over the second encrypted communication channel;
each of the participant nodes receives the plurality of encrypted aggregated ML models from the aggregator node;
each of the participant nodes decrypts one of the encrypted aggregated ML model using the participant node private key; and
each of the participant nodes updates its local ML model based on the aggregated ML model.

14. The system of claim 13, wherein each of the participant nodes removes its participant node public and private keys after decrypting the aggregated ML model.

15. The system of claim 13, wherein the aggregator node further communicates a request for the local ML models to the participant nodes.

* * * * *